United States Patent
Matthews et al.

(10) Patent No.: US 7,360,015 B2
(45) Date of Patent: Apr. 15, 2008

(54) PREVENTING STORAGE OF STREAMING ACCESSES IN A CACHE

(75) Inventors: Jeanna N. Matthews, Massena, NY (US); John I. Garney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 387 days.

(21) Appl. No.: 10/838,435

(22) Filed: May 4, 2004

(65) Prior Publication Data

US 2005/0251630 A1  Nov. 10, 2005

(51) Int. Cl.
G06F 13/00 (2006.01)
(52) U.S. Cl. .......... 711/113; 711/138
(58) Field of Classification Search ........ 711/113, 711/138
See application file for complete search history.

(56) References Cited

U.S. PATENT DOCUMENTS

| | | | | |
|---|---|---|---|---|
| 4,052,698 A * | 10/1977 | Ragle | ......... | 714/757 |
| 4,168,486 A * | 9/1979 | Legory | ......... | 714/759 |
| 4,375,664 A * | 3/1983 | Kim | ......... | 714/52 |
| 4,394,733 A * | 7/1983 | Swenson | ......... | 711/3 |
| 4,722,085 A * | 1/1988 | Flora et al. | ......... | 714/770 |
| 4,958,351 A * | 9/1990 | Flora et al. | ......... | 714/770 |
| 6,421,826 B1 * | 7/2002 | Kosche et al. | ......... | 717/161 |
| 6,578,111 B1 * | 6/2003 | Damron et al. | ......... | 711/133 |
| 6,961,820 B2 * | 11/2005 | Day et al. | ......... | 711/129 |
| 2005/0138281 A1 * | 6/2005 | Garney et al. | ......... | 711/112 |
| 2006/0282542 A1 * | 12/2006 | Pinckney et al. | ......... | 709/231 |

* cited by examiner

Primary Examiner—Reba I. Elmore
(74) Attorney, Agent, or Firm—Trop, Pruner & Hu, P.C.

(57) ABSTRACT

In one embodiment of the present invention, a method may include determining whether requested information is part of a streaming access, and directly writing the requested information from a storage device to a memory if the requested information is part of the streaming access. Alternately, if the requested information is not part of the streaming access, it may be written from the storage device to a cache. In various embodiments, the cache may be a non-volatile disk cache.

18 Claims, 4 Drawing Sheets

200

210 — Empty Potential Stream Array with 2 elements

Potential Stream[0] =      Potential Stream[1] =

220 — Read Lba 100, length 4

Potential Stream[0] =      Potential Stream[1] =
Start = 100
Length = 4
Timestamp = 1
NumRequests = 1

230 — Read lba 3, length 5

Potential Stream[0] =      Potential Stream[1] =
Start = 100      Start = 3
Length = 4      Length = 5
Timestamp = 1      Timestamp = 2
NumRequests = 1      NumRequests = 1

240 — Read lba 105, length 2

Potential Stream[0] =      Potential Stream[1] =
Start = 100      Start = 3
Length = 6      Length = 5
Timestamp = 3      Timestamp = 2
NumRequests = 2      NumRequests = 1

Stream indicated. Do not insert in cache.

250 — Read lba 70, length 2

Potential Stream[0] =      Potential Stream[1] =
Start = 100      Start = 70
Length = 6      Length = 2
Timestamp = 3      Timestamp = 4
NumRequests = 2      NumRequests = 1

Replace LRU element with new potential stream metadata

FIG. 3

PREVENTING STORAGE OF STREAMING ACCESSES IN A CACHE

BACKGROUND

Peripheral devices such as disk drives used in processor-based systems are typically slower than other circuitry in those systems. There have been many attempts to increase the performance of disk drives. However, because disk drives are electromechanical, there may be a finite limit beyond which performance cannot be increased. One way to reduce an information bottleneck at a peripheral device, such as a disk drive, is to use a cache. A cache is a memory device that logically resides between a device, such as a disk drive, and the remainder of the system, that serves as a temporary storage area for the device. Frequently accessed data resides in the cache after an initial access. Subsequent accesses to the same data may be made to the cache instead of to the disk drive.

To obtain the greatest benefit of caching data from a storage device such as a disk drive, data that is placed and maintained in the cache can be prioritized. Typically, data is inserted on an access and (if necessary) the least recently used data in the cache is evicted to make room for the newly accessed data. In many workloads, such a policy works well because there is a high degree of temporal locality in access patterns. However, there are workloads for which this method is sub-optimal. An important example is streaming data access patterns. Streaming data can flush useful data from the cache without obtaining any benefit from the cache itself. In fact, streaming accesses can actually cause performance to be worse with a cache than without a cache, due to the overhead of inserting data into the cache for which no benefit is obtained. A need thus exists to more effectively use cache resources.

BRIEF DESCRIPTION OF THE DRAWINGS

FIG. 3 is block diagram of an example program execution in accordance with one embodiment of the present invention.

DETAILED DESCRIPTION

Figure 1:
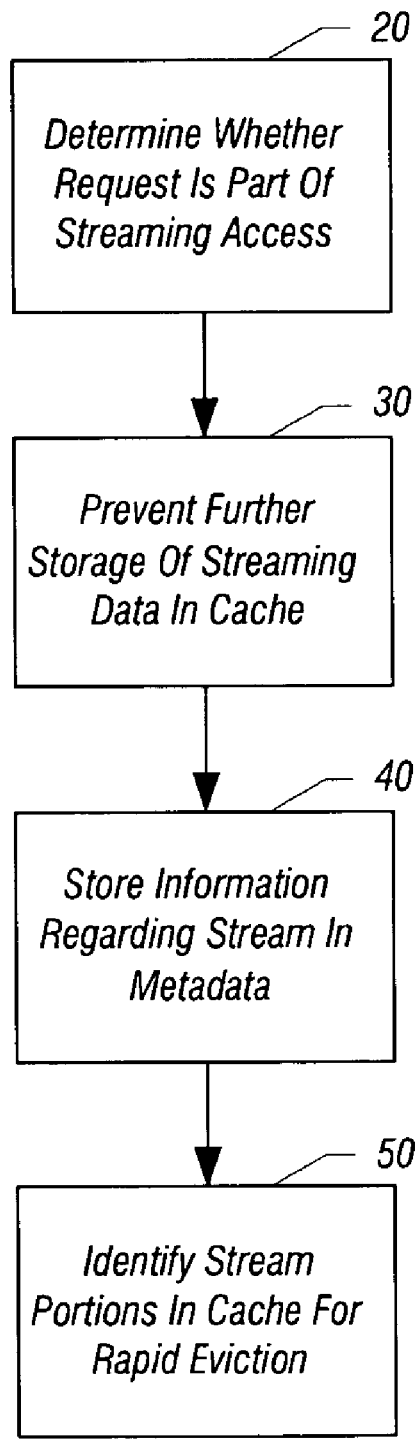
FIG. 1 is a flow diagram of a method in accordance with one embodiment of the present invention.

Referring to FIG. 1, shown is a flow diagram of a method in accordance with one embodiment of the present invention. As shown in FIG. 1, method 10 may begin by determining whether a request is part of a streaming access (block 20). As used herein, a "streaming access" or a "streaming access pattern" may refer to a series of accesses (which may be non-consecutive) to a sequential storage area, such as sequential disk accesses. Streaming data may be a string of data that is not reused with any frequency. While the length of such strings may vary, in certain embodiments, such strings may be at least approximately 20 disk blocks long, although the scope of the present invention is not so limited. While the information that is a subject of such a streaming access may vary, in certain embodiments such information may be streaming audio or video or an arbitrary data set.

There may be various ways to determine whether a request is part of a streaming access pattern. The determination may be made using management software, such as cache driver software, in certain embodiments. For example, a read demand request from a processor may be analyzed to determine whether the requested data to be accessed is part of a streaming data access. Or the request may be a write demand request to send data to a storage device, such as a disk drive.

If it is determined that the request is part of a streaming access, further storage of streaming data in a cache memory may be prevented (block 30). For example, a disk cache associated with a disk drive may not store such streaming data, as the data is not likely to be reused, and if stored therein may evict desired data within the cache.

Still referring to FIG. 1, in various embodiments information regarding the stream may be stored in metadata (block 40). Such information may be used to later identify the same stream, if later requested for access. Such metadata may be used to directly access the data for this later request from, for example, a disk drive and forego storage in a cache associated therewith.

Finally, in certain embodiments any portions of the stream previously stored in the cache prior to determining that the data access pattern indicates a streaming data access may be identified and marked for rapid eviction (block 50). In such manner, the cache may more efficiently store information that the system may reuse, and a system may provide robust performance even for work loads that are dominated by streaming data accesses.

While discussed above with regard to FIG. 1 as primarily being used to determine and handle streaming accesses from a disk drive, it is to be understood that the scope of the present invention is not so limited. For example, methods to identify and handle streaming accesses may be used in connection with caches associated with other lower hierarchy storage or memory devices.

As discussed above, various manners of implementing a method for identifying stream accesses and preventing such streams from being stored in a cache memory may be accommodated. In certain embodiments, a stream may be detected by analyzing accesses for a total number of requests accessing substantially contiguous information and the lengths of such requests. In one embodiment, a streaming pattern may be detected by recording information regarding recent access patterns into an array of "potential streams". Such an array may be stored in various locations, such as system memory or in the cache itself, for example. Each element in this array may include certain metadata, such as a starting location (e.g., starting disk address), a length, a count of the number of requests in the stream (or potential stream) and a timestamp indicating the arrival of the latest request in the stream (or potential stream).

While a request issued from a processor may be monitored or received at various locations, in one embodiment, the request may be monitored by a driver associated with the cache device. When a new request is issued, the array may be searched to determine whether the new request begins immediately after one of the existing stream elements in the array. If it does, the length of that element may be updated to include the new request and the number of requests in the stream may be incremented accordingly. If the new request does not match any of the stream elements (and the array is full), a least recently used potential stream element may be selected for eviction. The newly executed stream element may then be reset to have the starting location (e.g., logical block address (LBA)), length and timestamp of the new request, and the number of requests in the new potential stream may be set equal to 1.

When the number of requests in a stream element reaches a specified threshold level (i.e., a stream constant), the potential stream may be classified as a true stream. For example, if the stream constant is 2, then a second contiguous request may cause a potential stream element to be classified as a stream.

In certain embodiments, only read streams may be inserted in the potential stream array, as write streams may benefit from caching even if there is no repeated access, by deferring the cost of sending data to disk. By waiting to write data to disk, the data may often be combined with other adjacent writes to make it more efficient or in many cases, be deferred completely into idle time.

In certain embodiments, the more elements that exist in a potential stream array, the more tolerant a stream detection algorithm may be to interleaving of requests. In certain embodiments, the number of elements in a potential stream array may be between approximately 5-10 elements.

Once a stream has been detected, any subsequent requests of the same stream may not be inserted into the cache. Instead, the request will be sent directly to the disk uninterrupted, further increasing efficiency of the disk.

In addition, in certain embodiments once a stream has been detected, all earlier portions of that stream may be marked for rapid eviction from the cache. Such portions may already have displaced some elements of the cache that are more likely to be reused. By marking earlier stream portions for rapid eviction, these portions will be the next items displaced from the cache, rather than additional useful data.

However, in certain embodiments the first cacheline in the stream may be maintained in the cache and marked as the beginning of a stream to act as an indicator for future accesses. Once the stream is completed (i.e., when it is evicted from the potential stream array), the final length of the stream may be denoted in metadata for the initial cacheline. In the future, if this beginning of stream marker is hit, the stream information may be used to prefetch the rest of the stream into memory (and not be inserted into the cache), and to avoid inserting even the beginning of the stream into the cache.

Figure 2:
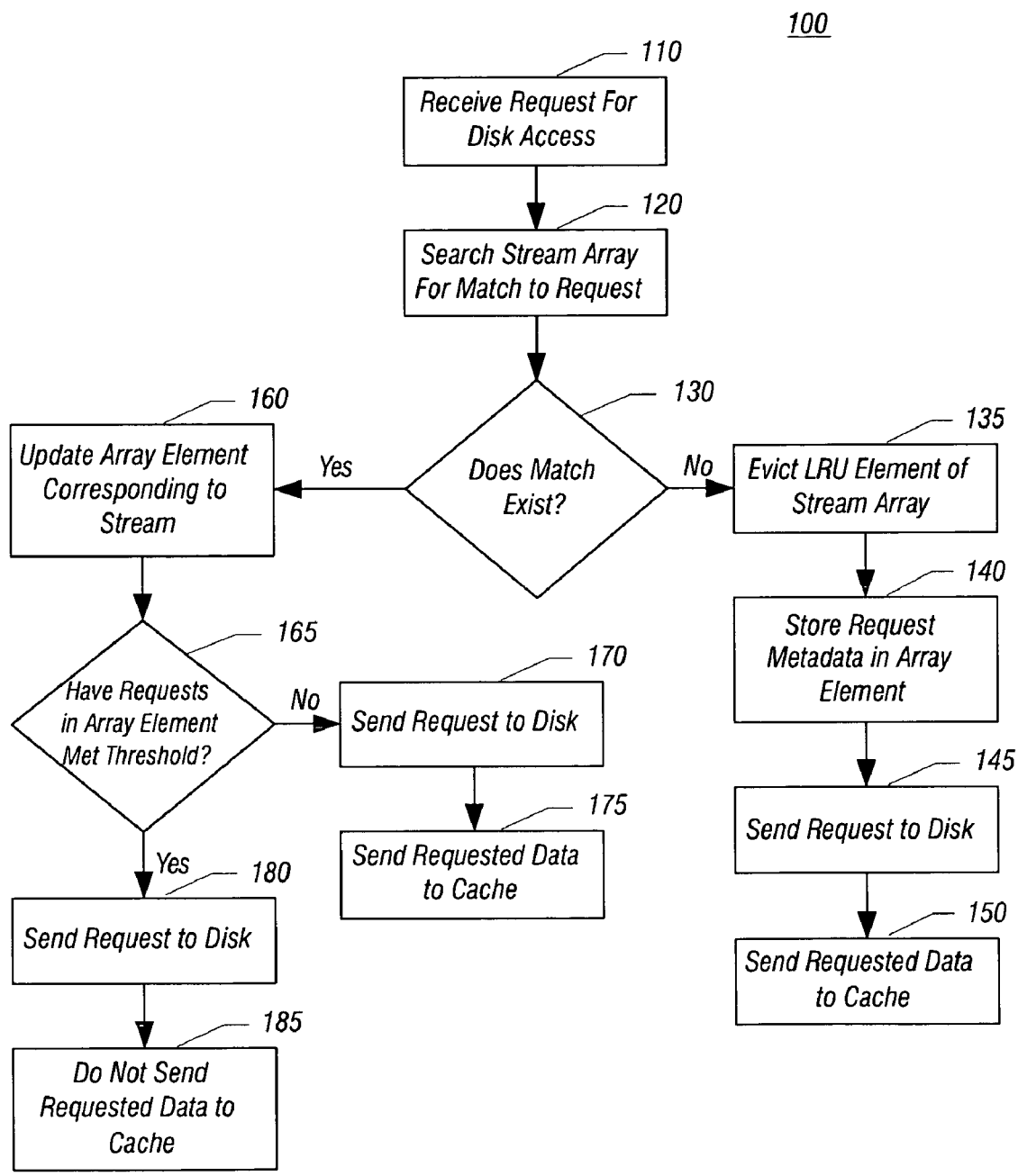
FIG. 2 is a flow diagram of a method of identifying streaming accesses in accordance with one embodiment of the present invention.

Referring now to FIG. 2, shown is a flow diagram of a method for implementing identification of data streams and policies for acting upon them in accordance with one embodiment of the present invention. As shown in FIG. 2, method 100 may begin by receiving a request for disk access (block 110). For example, in one embodiment, a processor may issue a read demand request for desired data. If such data is not present in various memory hierarchy locations, such data may need to be obtained from a lowest hierarchy memory device, such as a disk drive. Of course, in other embodiments the request may be a write demand request. To prevent streaming data from evicting cached data that may be reused, driver software or other combination of software, firmware and/or hardware may search a stream array to determine whether the request corresponds to a location (e.g., a logical block address (LBA)) associated with a previously identified stream or potential stream. For example, such a stream array may be a table stored in a desired memory which includes metadata identifying previously detected streams by various parameters including, for example, location, stream length, beginning data pattern, and the like.

Next it may be determined whether a match exists in such a stream array (diamond 130). If no such match is present, a least recently used (LRU) element of the stream array may be evicted (block 135) (if necessary). Then metadata corresponding to the request may be stored in the array element that was evicted (block 140). As discussed, such metadata may take various forms, including address information, stream length, stream content, and the like. Then, if the request is a read request, the request may be sent to the disk (block 145). The disk may then access the requested data and send the data for storage in a disk cache associated therewith (block 150). From there, the processor may more efficiently access the requested data. Alternately, in an embodiment in connection with a write request, the data may be sent to the cache in accordance with a given cache policy, e.g., write back or write through (instead of the flow of blocks 145 and 150).

If instead at diamond 130 it is determined that a match exists for the read request in the stream array, control may pass to block 160. There, the array element corresponding to the stream may be updated (block 160). For example, information corresponding to the request, such as location information and request length, may be inserted into the metadata associated with the array element for further identification of read requests corresponding to the stream. Next it may be determined whether sufficient requests are present in the array element to meet a threshold (e.g., a stream constant) (diamond 165). Such a threshold may be based on a number of requests, length of the requests, or a combination thereof. In different embodiments, the threshold may be based on other parameters.

If such a threshold has not been met, if the request is a read request, the request may be sent to the disk (block 170), and the requested data may be sent from the disk to the cache for storage therein (block 175). Then such cached data may be more efficiently accessed by the processor. If the request is a write request, the data may be sent to the cache.

If instead at diamond 165 it is determined that the number of requests in the array element meets the threshold, the read request may be sent to the disk (block 180). Now however, instead of storing the data first to the cache, the data is not sent to the cache (block 185). Instead, the data may be sent directly to system memory. If the request is a write request, the data may be sent directly to the disk, foregoing the cache, in certain embodiments.

In such manner, desired cached data (e.g., data likely to be reused) may remain in a cache and not be evicted by streaming data. In various embodiments, in addition to identifying a stream, previous accesses associated with the stream stored in the cache may be marked for rapid eviction therefrom, further freeing cache space for data more suitable to cache storage.

Referring now to FIG. 3, shown is an example program execution in accordance with one embodiment of the present invention. As shown in FIG. 3, program execution 200 may represent execution of a program in which a potential stream array includes a first array element and a second array element, for purposes of illustration. Further, the example of FIG. 3 is based on using a threshold equal to two, although the scope of the present invention is not so limited.

The program execution shown in FIG. 3 may begin at time 210 with an empty potential stream array having two elements, namely a first potential stream element (i.e., Potential Stream[0]) and a second potential stream element (i.e., Potential Stream[1]). At a later time 220, a read demand request is issued by a processor to read data at a given disk address and length. As shown in FIG. 3 at time 220, the read request may be for data having a length of four disk blocks beginning at a LBA 100. Thus at time 220, certain metadata corresponding to this read request may be stored in the first element of the stream array. Specifically, as shown in FIG. 2, the metadata may include start location information (e.g., LBA 100); request length (e.g., four); a time stamp, which may refer to a time at which a request is issued; and a number of requests (i.e., NumRequests), which may equal a given number of requests corresponding to the potential stream.

Then at later time 230, another read demand request is issued, this time requesting a length of five disk blocks, beginning at LBA 3. Since this request clearly is not part of a data stream with the first request received, metadata corresponding to this read request may be stored in the second potential stream element (i.e., Potential Stream[1]).

At a next later time 240, another read request is issued. As shown in FIG. 3, this read request is for a length of two disk blocks beginning at LBA 105. Because this request begins immediately where the previous request for the first element ended, metadata corresponding to this read request may also be stored in the first element of the potential stream array. Specifically, as shown in FIG. 3, the length portion of the metadata may be updated to include the length of this third request. Similarly, the time stamp may also be updated to reflect the present request. Additionally, the number of requests may also be updated to reflect that the potential stream is formed of two requests. In the embodiment shown in FIG. 3, because a stream constant of two is presumed, this read request may indicate that the potential stream is an actual stream. As a result, data corresponding to this read request is not inserted into the cache.

Referring still to FIG. 3, at a next later time 250, a fourth read request is issued by the processor. This request requests a length of two disk blocks, beginning at LBA 70. Because this read request does not relate to any of the previous requests, metadata corresponding to this request may be stored in the potential stream array. However, since only two elements exist in the stream array of the embodiment of FIG. 3, the least recently used element, namely potential stream element one, may be replaced with metadata corresponding to this most recent read request, as shown at time 250.

Embodiments may be implemented in a program. As such, these embodiments may be stored on a storage medium having stored thereon instructions which can be used to program a system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), electrically erasable programmable read-only memories (EEPROMs), flash memories, a phase change or ferroelectric memory, a silicon-oxide-nitride-oxide-silicon (SONOS) memory, magnetic or optical cards, or any type of media suitable for storing electronic instructions. Similarly, embodiments may be implemented as software modules executed by a programmable control device, such as a computer processor or a custom designed state machine.

Figure 4:
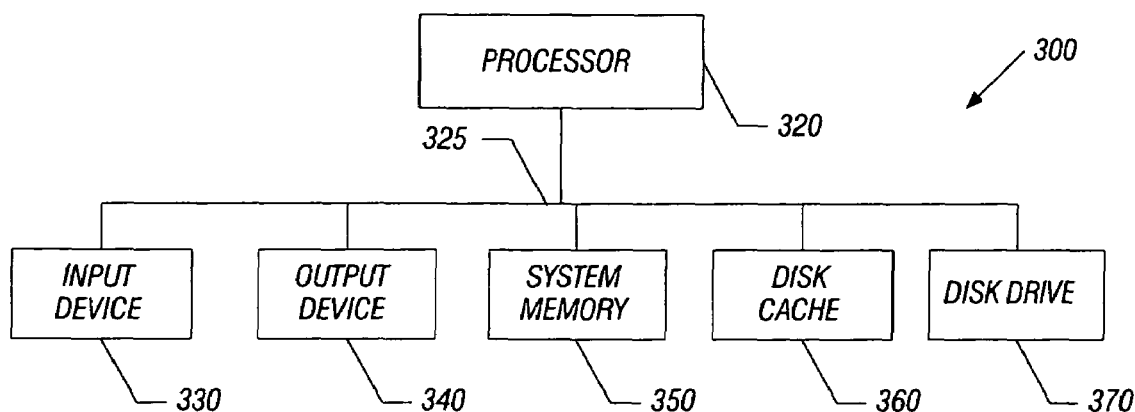
FIG. 4 is a block diagram of a system with which embodiments of the present invention may be used.

Referring now to FIG. 4, shown is a block diagram of a system with which embodiments of the invention may be used. While discussed in FIG. 4 as a computer such as a desktop, notebook, or server computer, it is to be understood that other embodiments may be used with other types of systems, including a wireless device, such as a cellular telephone, personal digital assistant (PDA) or any other variety of other processor-based systems. As shown in FIG. 4, system 300 may include a processor 320 coupled to various devices by a bus 325. In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In various embodiments, one or more such buses in accordance with a desired protocol may be present, and certain components shown in FIG. 4 may be coupled to processor 320 by hub devices such as a memory controller hub and an input/output (I/O) hub. However, such hubs are not shown in FIG. 4 for simplicity.

As shown in FIG. 4, processor 320 may be coupled to an input device 330. Input device 330 may be a keyboard or a mouse, in certain embodiments. System 300 may also include an output device 340 coupled to processor 320. Output device 340 may include a display device such as a cathode ray tube monitor, liquid crystal display, or the like. Additionally, processor 320 may be coupled to a system memory 350 which may include any number of memory devices such as a plurality of read-only memory (ROM) and random access memory (RAM) (e.g., dynamic RAM (DRAM)). Additionally, system 300 may include a disk cache 360 coupled to processor 320. Disk cache 360 may include an option read-only memory which may be a medium for storing instructions and/or data. Other mediums for storing instructions may include system memory 350, disk cache 360, and disk drive 370. Processor 320 may also be coupled to disk drive 370 which may be a hard drive, a solid state disk device, a floppy drive, a compact disk drive (CD), or a digital video disk (DVD) or the like. In an alternate embodiment, disk cache 360 may be connected to processor 320, and disk drive 370 may instead be connected to disk cache 360.

Disk cache 360 may be used as cache storage for disk drive 370, in certain embodiments. Alternately, data from another lower hierarchy memory or storage associated with system 300 may be stored in cache 360. Disk cache 360 may be made from a ferroelectric polymer memory, in certain embodiments. In such an embodiment, data may be stored in layers within the memory, and the higher the number of layers, the higher the capacity of the memory. Each of the polymer layers may include polymer chains with dipole moments. Data may be stored by changing the polarization of the polymer between metal lines. Ferroelectric polymer memories are non-volatile memories with sufficiently fast read and write speeds. For example, microsecond initial reads may be possible with write speeds comparable to those with flash memories. In other embodiments, disk cache 360 may be another non-volatile memory such as a flash memory, although the scope of the present invention is not so limited.

In typical operation of system 300, processor 320 may access system memory 350 to retrieve and then execute a power on self-test (POST) program and/or a basic input output system (BIOS) program. In certain embodiments, BIOS may include code to manipulate disk cache 360. Processor 320 may use the BIOS or POST software to initialize system 300. Processor 320 may then access the disk drive 370 to retrieve and execute operating system software and applications. The operating system software may include device drivers which may include, for example, a cache driver for disk cache 360.

In various embodiments, disk cache 360 may be used to cache data for disk drive 370, although the scope of the present invention is not so limited. However, when accesses are determined to be streaming accesses, data obtained from disk drive 370 may be sent directly to system memory 350, avoiding disk cache 360. In such manner, desired cached data may remain in disk cache 360 without being evicted by streaming data.

It is to be understood that in embodiments in which system 100 is a wireless device additional components may be present such as a digital signal processor (DSP) and other such devices. A wireless interface (which in turn may have an antenna which, in various embodiments, may be a dipole antenna, helical antenna, global system for mobile communication (GSM) or another such antenna) may also be present.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   locating a cache between a mass storage device and a system memory;
   receiving a first request for disk access, the first request requesting first information;
   receiving a second request for disk access, the second request requesting second information;
   determining whether the second information is part of a streaming access based on a comparison of first metadata associated with the first request and second metadata associated with the second request; and
   writing the second information from the mass storage device directly to the system memory if the second information is part of the streaming access.

2. The method of claim 1, further comprising writing the second information from the mass storage device to the cache if the second information is not part of the streaming access.

3. The method of claim 1, further comprising the first metadata stored with the first information in the cache.

4. The method of claim 1, further comprising determining whether the second information is part of a streaming access based on whether an end address of the first information immediately proceeds a start address of the second information.

5. The method of claim 1, further comprising the first metadata including a first length of the first information and a first end address of the first information.

6. The method of claim 5, further comprising the first metadata including a first time stamp for the first request.

7. The method of claim 1, further comprising comparing a count of read requests in a stream array to a threshold, the threshold equaling two or more read requests.

8. The method of claim 7, further comprising updating the first metadata to include the second metadata if the threshold is not met.

9. The method of claim 7, further comprising identifying the read requests as the streaming access if the threshold is met, wherein the read requests include the first request and the second request.

10. The method of claim 9, further comprising marking the first information for rapid eviction from a cache.

11. The method of claim 10, further comprising maintaining a first portion of the first information in the cache.

12. The method of claim 11, further comprising using the first portion to determine whether a later third request is a streaming request.

13. An apparatus comprising:
    at least one memory coupled to a cache located between a mass storage and a system memory, the at least one memory to store code to prevent storage of stream data in the cache and to send the stream data to the system memory directly from the mass storage based on a comparison of first metadata of a first request for first information and second metadata of a second request for second information.

14. The apparatus of claim 13, wherein the code further includes instructions to directly send the stream data to the system memory from a disk comprising the mass storage.

15. The apparatus of claim 13, wherein the cache comprises a disk cache.

16. The apparatus of claim 13, wherein the cache comprises a non-volatile memory.

17. The apparatus of claim 16, wherein the non-volatile memory comprises a ferroelectric memory.

18. The apparatus of claim 13, wherein the system memory comprises the at least one memory.

* * * * *